UNITED STATES PATENT OFFICE.

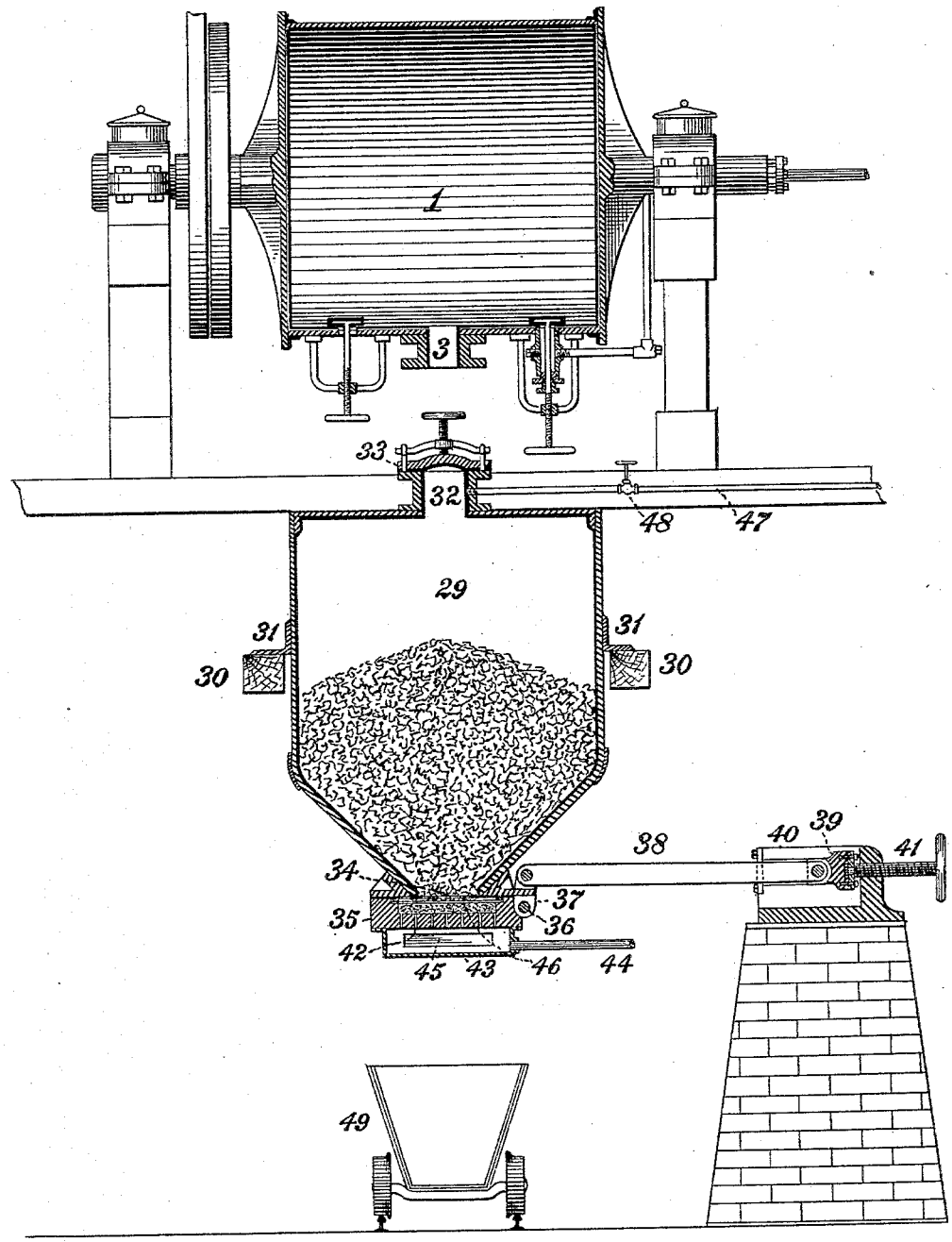

GEORGE W. GOETZ, OF PITTSBURG, PENNSYLVANIA, ASSIGNOR TO THE ORE REDUCTION COMPANY, OF SAME PLACE.

FILTERING APPARATUS.

SPECIFICATION forming part of Letters Patent No. 411,743, dated September 24, 1889.

Application filed November 23, 1888. Serial No. 291,686. (No model.)

*To all whom it may concern:*

Be it known that I, GEORGE W. GOETZ, a citizen of the United States, residing at Pittsburg, in the county of Allegheny and State of Pennsylvania, have invented or discovered a certain new and useful Improvement in Filtering Apparatus, of which improvement the following is a specification.

The object of my invention is to provide a simple, compact, and inexpensive apparatus by the use of which the separation of aqueous solutions from pulp may be thoroughly and expeditiously effected; to which end my invention, generally stated, consists in the combination of a separating-vessel having an upper charging opening and door and a lower discharge-opening, a filtering-box covering the discharge-opening and fitted to be removed from and replaced in position thereon, and a fluid-pressure pipe governed by a regulating-valve and leading into the separating-vessel above the normal level of its charge.

The improvement claimed is hereinafter fully set forth.

My invention, while applicable in the separation of solutions from pulp of various descriptions, is more particularly designed for use in connection with the extraction of metals from ores, in which art such separation has been heretofore ordinarily effected either by decantation or filtration, both of which operations are in certain respects unsatisfactory and objectionable. Where decantation is employed, the ore-pulp is mixed and stirred up with water, then allowed to settle, and the supernatant liquid is drawn off, after which more water is added and the operation repeated until the desired solution is extracted as fully as practicable. This method involves considerable time and a comparatively large space is occupied by the apparatus, and it moreover fails to completely remove the solution from the pulp. In the case of filtration the commingled pulp and solution are placed upon a filter-bed having a large area, so that the material may be spread in as thin a layer as possible, and after a portion of the solution has been filtered off water is added from time to time until the metallic solution is extracted as fully as the nature of the operation will permit. As in the former case, much time and space are required and the filters are readily clogged up and so become inefficient. The escape of acid vapors from the material is likewise in some cases a serious objection. Under my invention a material reduction in the time required for a thorough separation is effected, and in the treatment of ores of the precious metals waste from loss of solution is prevented. The apparatus being comparatively small and compact, but little space is required, and the separating-vessel being closed no inconvenience is occasioned by the evolution of volatile constituents.

The accompanying drawing is a vertical central section through a desiccator embodying my invention, the same being shown as adapted to be charged from a rotating cylinder or barrel for the extraction of metals from ores.

In the practice of my invention I provide a separating chamber or vessel 29, of any suitable form, which is preferably cylindrical for the major portion of its depth and for the remainder inwardly tapering or conical toward its lower end. The chamber 29, which may be lined with lead or other material proper to resist corrosion, is supported in any convenient manner, as by horizontal beams 30, to which it is connected by angle-plates 31, and is provided at its top with a charging-opening 32, closed by a removable door or cover 33.

A discharge-opening 34 is formed centrally in the lower end of the separating-chamber and is adapted to be covered or uncovered, as required, by a movable filter-box 35, which is fitted to bear closely against the periphery of the chamber around the discharge-opening and to be moved entirely clear of the same during the separation of the solution and the discharge of the pulp thereafter, respectively. In this instance the filter-box is pivoted at one side to the separating-chamber by a pin 36, and is provided with arms 37, coupled by a link 38 to a block 39, which is fitted to slide in horizontal guides 40, and is secured to a screw 41, by the movement of which in one or the other direction the filter-box may be held closely against the separating-vessel in the position shown in the drawing, or be swung downwardly upon its pivot 36, so as to fully expose the discharge-opening 34 for the free delivery of material therefrom. The particular means for moving the filter-box are not, however, an essential of my invention, and a sliding box may, if preferred, be substituted as a mechanical equivalent in the apparatus for the swinging box shown.

The filter-box 35 communicates by a series of small perforations 42 in its lower side with a fluid-discharge chamber 43, secured thereto, said chamber being provided with a discharge-pipe 44, leading to a proper receptacle and having openings in its sides closed by transparent sight-plates 45, to permit the operator to observe the cessation of the flow of liquid from the separating-chamber. Suitable filtering material 46 is located in the space within the filter-box, an effective arrangement of the same consisting of a layer of cloth placed above the perforations 42, and sand or similar material interposed between the same and a corresponding upper layer. A fluid-pressure supply-pipe 47, governed by a regulating-valve 48, is led from a reservoir or generator of fluid under pressure—as air, steam, or water—into the separating-chamber 29 at a point adjacent to its top or above the normal level to which it is supplied with material to be treated.

In operation a charge of pulp is supplied to the separating-chamber through the opening 32, which is then tightly closed by the door 33. To facilitate the charging of the chamber, the latter is preferably located below the apparatus from which the pulp is delivered, and in such relation thereto that the pulp may either drop by gravity directly into the charging-opening 32 or be led thereto by a suitable chute or conveyer. The drawing illustrates a construction in which ore-pulp is delivered directly from the discharge-opening 3 of a rotating cylinder or barrel 1 into the separating-chamber, the cylinder and its accessories, which are shown as exemplifying an arrangement as above specified, being similar to the corresponding members set forth in a separate application for Letters Patent filed by me of even date herewith, Serial No. 291,687, and not constituting part of my present invention. The separating-vessel having been charged and the door of the charging-opening closed, a current of fluid under pressure (air by preference) is admitted through the pipe 47, the action of which pressure upon the material in the separating-vessel expels the aqueous solution therefrom, forcing it through the filtering material 46 into the discharge-chamber 43, whence it is led off by the discharge-pipe 44 to a storage-tank or other proper receptacle. When the extraction of the solution has been completed, as indicated by the cessation of the passage of liquid into the discharge-chamber, which can be noted by inspection through the sight-plates 45, a sufficient quantity of water may then be admitted to the separating-vessel to moisten the spent pulp throughout, so that it may readily flow, and the filter-bed is moved away from the discharge-opening 34, through which, when thus exposed, the spent pulp drops into a car 49 or other suitable receptacle placed below the discharge-opening. The filter-box is then restored to its former position in readiness for a succeeding operation.

It will be seen that by the apparatus above described the separation can be quickly and effectively performed, and thus the aqueous solutions can be extracted from large quantities of pulp in a comparatively short time and with but little manipulation. The thoroughness of the operation prevents loss of the valuable metals which may be held in solution, and the apparatus being closed the vitiation of the adjacent atmosphere by acid fumes which arise from the large open tanks or vats heretofore employed is fully obviated.

I am aware that an ore-treating vessel having a casing containing filtering material permanently secured to one of its ends and provided with a pipe for the admission of steam, by the pressure of which the liquid contents of the vessel may be forced through the filtering material, was known in the art prior to my invention, and I do not, therefore, broadly claim the above or any other construction in which the separation of the liquid and solid constituents of the charge of a vessel is effected by the action of internal pressure. I am not, however, aware of the prior use of a movable filter-box, as herein set forth, nor of any equivalent means by which the independent and consecutive discharge of the liquid and solid constituents may be effected through a single discharge-opening and without necessitating the movement of the separating-vessel.

I claim as my invention and desire to secure by Letters Patent—

1. The combination of a separating-chamber provided with an upper charging-opening and door and a lower discharge-opening, a movable filter-box hinged or pivoted to the chamber in position to cover and uncover the discharge-opening, and a fluid-pressure supply-pipe leading into the chamber above the normal level of charge, substantially as set forth.

2. The combination of a separating-chamber provided with an upper charging-opening and door and a lower discharge-opening, a movable filter-box hinged or pivoted to the chamber in position to cover and uncover the discharge-opening, a fluid-discharge chamber provided with a discharge-pipe and communicating at top with the filter-box, and a fluid-pressure supply-pipe leading into the separating-chamber above the normal level of charge, substantially as set forth.

In testimony whereof I have hereunto set my hand.

GEORGE W. GOETZ.

Witnesses:
J. SNOWDEN BELL,
R. H. WHITTLESEY.